July 25, 1933.  J. GRÖBL  1,919,509

MULTIPLE LAY CABLE

Filed Aug. 24, 1929

Josef Gröbl
INVENTOR:
By Otto Munk
his Attorney.

Patented July 25, 1933

1,919,509

UNITED STATES PATENT OFFICE

JOSEF GRÖBL, OF SOLLN NEAR MUNICH, GERMANY, ASSIGNOR TO THE FIRM BAYERNWERK AKTIENGESELLSCHAFT, OF MUNICH, GERMANY

MULTIPLE LAY CABLE

Application filed August 24, 1929, Serial No. 388,136, and in Germany September 6, 1928.

In the installation of cables, particularly of long-distance lines, cracking of the cables is often experienced though the specific load amounts to not more than about 50% of the breaking resistance determined in the laboratory tests. Researches have shown that these breaks are caused by the specific form of the cables. Cables are formed by helically disposed wires. These helically wound wires give rise to transverse forces, exerting torsional moments proportional to the length of their lever arms. As the directions of the lays (winding directions) are alternating, the resulting differential torsional moment will twist the cable and thereby disturb the equal specific distribution of the load. Therefore it is desirable to prevent the occurrence of those differential torsional moments, i. e. to make the difference equal to zero.

Figure 1:
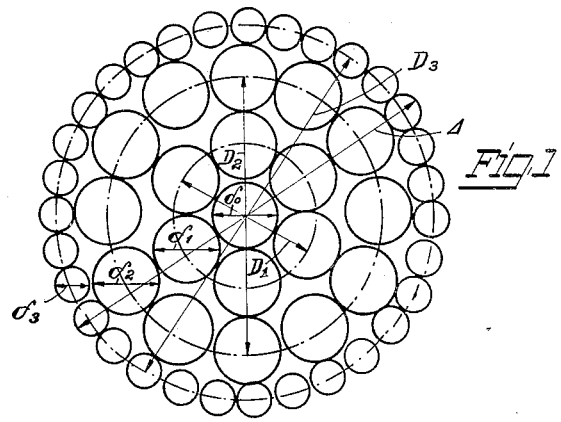
Figure 2:
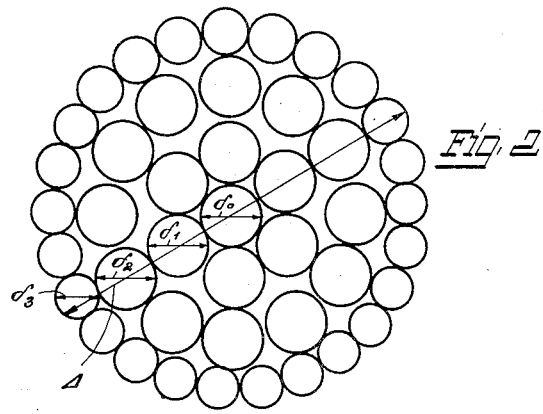

In the following, my invention will be described with reference to the accompanying drawing, in which Figure 1 is a transverse sectional view of a three-lay cable with alternating winding direction, and Figure 2 is a transverse sectional view of a three-lay cable, the two inner lays thereof being turned to the left, while the outermost lay is turned to the right.

The present invention solves the problem of eliminating torsional moments by disposing the layers on a core in such a way that in the outermost layer the pitch of the individual wires is greater than that of the wires of the inner layer, whereby the diameter of the individual wires of the outer layer is smaller than that of the individual wires of the inner layer. It has been found that the dimensions of the wires and their pitch in the several layers have a certain inter-relationship and the theroretical tests made have shown that freedom from torsion may be obtained by causing the cable to meet the condition $$\frac{D_1 \cdot Z_1 \cdot \epsilon_1}{1+\left(\frac{\epsilon_1}{\pi}\right)^2} + \frac{D_2 \cdot Z_2 \cdot \epsilon_2}{1+\left(\frac{\epsilon_2}{\pi}\right)^2}\left(\frac{\delta_2}{\delta_1}\right)^2 \pm \cdots \frac{D_n \cdot Z_n \cdot \epsilon_n}{1+\left(\frac{\epsilon_n}{\pi}\right)^2}\left(\frac{\delta_n}{\delta_1}\right)^2 = 0$$

wherein each of the above terms refers to a single layer and D is the mean diameter of the lay, Z is the number of elements of the lay, $\epsilon$ is the factor of turn lengths (between 11 and 14), $\delta$ is the diameter of one element, $+$ meaning the left, $-$ meaning the right direction of winding, and the index 1, 2, ... $n$ indicating the ordinal number of the lay, counted from the core. The turn length is comparable to the pitch of a screw thread. The turn length factor is defined as the factor by which the diameter (D) of a layer is to be multiplied to get the pitch, i. e. the length of a turn measured parallel to the cable axis. The preferable extreme values to be used are 11 and 14.

In practice it is preferable to eliminate the quantities D and Z from the equation and to base the equation exclusively on the quantities $\delta$ and $\epsilon$.

For a three-lay cable with alternating winding directions and $\delta_1 = \delta_2$ the theoretical derivation furnishes the following condition $$x^3(a\eta_1 - b\eta_2) + c\pi\eta_3 x^2 + d\pi\eta_3 x + e\pi\eta_3 = 0,$$

wherein $$x = \frac{\delta_2}{\delta_3} \text{ and } \eta = \frac{\epsilon}{1+\left(\frac{\epsilon}{\pi}\right)^2}$$

$a, b, c, d$ and $e$ represent constants of the following values: $a=12$; $b=48$; $c=25$; $d=10$; $e=1$. $\epsilon_1$ is to be inserted into this equation as maximum (14), $\epsilon_2$ as minimum (11), $\epsilon_3$ as maximum (14).

The accompanying Figure 1 shows in cross section a three-lay cable of this kind, in which $Z_1$ i. e. the number of wires of lay (1) is 6, $Z_2$ i. e. the number of wires of lay (2) is 12 and $Z_3$ i. e. the number of wires of lay (3) is 31. The diameters $\delta_0$ of the core wire, $\delta_1$ of a wire of the lay 1, and $\delta_2$ of a wire of the lay 2 are of equal size. The diameter $\delta_3$ of a wire of lay 3 is about $\frac{\delta_2}{1.77}$. With respect to the total cable diameter $\Delta$ there is $$\delta_0 = \delta_1 = \delta_2 = \frac{\Delta}{6.1} \text{ and } \delta_3 = \frac{\Delta}{11}.$$

Within the turn length $\epsilon = 11—14$ the determination of other diameters and numbers of wires are possible, their application however, is less practical.

For a three-lay cable with two parallel inner lays (for instance to the left) and one outer lay disposed in the opposite direction, the condition for freedom from torsion is $$x^3(-a\eta_1 - b\eta_2) + c\pi\eta_3 x^2 + d\pi\eta_3 x + e\pi\eta_3 = 0$$

In this case $\epsilon_1$ is to be inserted as minimum, $\epsilon_2$ likewise as minimum, $\epsilon_3$ as maximum. The constants $a, b, c, d$ and $e$ remain the same as in the preceding example. Figure 2 shows in cross section a three-lay cable of this kind. The inner lays 1 and 2 of this cable are turned to the left and the exterior lay 3 is turned to the right. Differing from the preceding example in this case $Z_3$ (number of wires of the exterior lay 3) is 25.

In this way the equations for four and more lay cables may be determined.

What I claim is:

1. A three or more strand cable comprising a core, a plurality of layers wound thereupon, each layer comprising a plurality of individual elements, the diameter of each of the individual elements of the inner layers being greater than that of the individual elements of the outermost layer and the pitch of the individual elements of the inner layers being smaller than that of the individual elements of the outermost layer, whereby the dimensions of the said cable constituents and the pitch are correlated and defined by the following equation:

$$\frac{D_1 \cdot Z_1 \cdot \epsilon_1}{1+\left(\frac{\epsilon_1}{\pi}\right)^2} \pm \frac{D_2 \cdot Z_2 \cdot \epsilon_2}{1+\left(\frac{\epsilon_2}{\pi}\right)^2}\left(\frac{\delta_2}{\delta_1}\right)^2 \pm \cdots \frac{D_n \cdot Z_n \cdot \epsilon_n}{1+\left(\frac{\epsilon_n}{\pi}\right)^2}\left(\frac{\delta_n}{\delta_1}\right)^2 = 0$$

in which D designates the diameter of a layer from mid portion to mid portion, Z designates the number of the individual elements of a layer, $\epsilon$ designates the factor by which the diameter of a layer, measured from outer circumference to outer circumference, must be multiplied to obtain the length of one turnover of the layer measured parallel to the longitudinal axis of the cable, $\delta$ designates the diameter of an individual element of a layer, the plus marks and minus marks indicate the left and right winding direction respectively, and the indices $1, 2 \ldots n$ indicate the layer member counted from the core of the cable.

2. A three strand cable comprising a core, three layers wound thereupon and each layer comprising a plurality of individual elements, the two inner layers having the same winding direction, the outermost layer having a winding inverse to that of the inner layers, said inner layers moreover having the smallest possible pitch and the outermost layer having the greatest possible pitch, whereby the dimensions of the said cable constituents and the pitch are correlated and defined by the following equation:

$$\frac{D_1 Z_1 \epsilon_1}{1+\left(\frac{\epsilon_1}{\pi}\right)^2} \pm \frac{D_2 Z_2 \epsilon_2}{1+\left(\frac{\epsilon_2}{\pi}\right)^2}\left(\frac{\delta_2}{\delta_1}\right)^2 \pm \frac{D_3 Z_3 \epsilon_3}{1+\left(\frac{\epsilon_2}{\pi}\right)^2}\left(\frac{\delta_3}{\delta_1}\right)^2 = 0$$

in which D designates the diameter of a layer from mid portion to mid portion, Z designates the number of the individual elements of a layer, $\epsilon$ designates the factor by which the diameter of a layer, measured from outer circumference to outer circumference, must be multiplied to obtain the length of one turnover of the layer measured parallel to the longitudinal axis of the cable, $\delta$ designates the diameter of an individual element of a layer, the plus and minus marks indicate the left and right winding direction respectively, and the indices 1, 2 and 3 indicate the first, second and third layer counted from the core.

JOSEF GRÖBL.